US010140254B2

(12) United States Patent
Karpov

(10) Patent No.: US 10,140,254 B2
(45) Date of Patent: Nov. 27, 2018

(54) METHODS AND SYSTEMS FOR REPRESENTING A DEGREE OF TRAFFIC CONGESTION USING A LIMITED NUMBER OF SYMBOLS

(71) Applicant: YANDEX EUROPE AG, Lucerne (CH)

(72) Inventor: Victor Vladimirovich Karpov, Moscow (RU)

(73) Assignee: Yandex Europe AG, Lucerne (CH)

( * ) Notice: Subject to any disclaimer, the term of this patent is extended or adjusted under 35 U.S.C. 154(b) by 337 days.

(21) Appl. No.: 14/896,573

(22) PCT Filed: Jun. 9, 2014

(86) PCT No.: PCT/US2014/041604
§ 371 (c)(1),
(2) Date: Dec. 7, 2015

(87) PCT Pub. No.: WO2014/197911
PCT Pub. Date: Dec. 11, 2014

(65) Prior Publication Data
US 2016/0124906 A1   May 5, 2016

(30) Foreign Application Priority Data

Jun. 7, 2013  (WO) ................ PCT/RU2013/000471

(51) Int. Cl.
*G06F 17/18* (2006.01)
*G06N 3/08* (2006.01)
(Continued)

(52) U.S. Cl.
CPC ............ *G06F 17/18* (2013.01); *G06N 3/04* (2013.01); *G06N 3/08* (2013.01); *G08G 1/012* (2013.01);
(Continued)

(58) Field of Classification Search
None
See application file for complete search history.

(56) References Cited

U.S. PATENT DOCUMENTS 5,354,957 A * 10/1994 Robertson
5,459,665 A    10/1995 Hikita et al.
(Continued)

FOREIGN PATENT DOCUMENTS

WO    200225452 A2    3/2002

OTHER PUBLICATIONS

Russian Search Report from corresponding RU 2016100024 dated Aug. 8, 2017.
(Continued)

*Primary Examiner* — Syed A Roni
(74) *Attorney, Agent, or Firm* — BCF LLP

(57) ABSTRACT

Method of creating a computerized model for computing values representative of traffic congestion in respect of a geographic area for use in representing a degree of traffic congestion in the geographic area using a limited number of symbols, comprising: retrieving, in respect of roads within geographic area, historical traffic data and values representative of traffic congestion; deriving a computerized model for computing values representative of traffic congestion in respect of roads within the geographic area based on the retrieved information. Method of representing a degree of traffic congestion in a geographic area using a limited number of symbols, comprising: receiving recent traffic and weather data including one of recent average vehicle speed and recent average vehicle transit time and two of temperature, relative humidity, barometric pressure, and cloud cover; and computing a value representative of traffic congestion using the recent traffic and weather data and a trained artificial neural network.

13 Claims, 8 Drawing Sheets

(51) Int. Cl.
*G06N 3/04* (2006.01)
*G08G 1/01* (2006.01)
(52) U.S. Cl.
CPC ......... *G08G 1/0129* (2013.01); *G08G 1/0141* (2013.01)

(56) References Cited

U.S. PATENT DOCUMENTS

| | | |
|---|---|---|
| 6,411,946 B1 | 6/2002 | Chaudhuri |
| 7,203,595 B1 | 4/2007 | Auxer et al. |
| 7,698,055 B2 | 4/2010 | Horvitz et al. |
| 7,813,870 B2 | 10/2010 | Downs et al. |
| 7,912,627 B2 | 3/2011 | Downs et al. |
| 7,953,544 B2 | 5/2011 | Amemiya et al. |
| 8,160,805 B2 | 4/2012 | Downs et al. |
| 2006/0064233 A1 | 3/2006 | Adachi et al. |
| 2007/0005230 A1 | 1/2007 | Sera |
| 2008/0234922 A1* | 9/2008 | Ishikawa ............ G08G 1/0104 701/119 |
| 2011/0106416 A1 | 5/2011 | Scofield et al. |
| 2011/0112747 A1 | 5/2011 | Downs et al. |
| 2011/0246052 A1* | 10/2011 | Zaitsu |
| 2012/0130625 A1* | 5/2012 | Srivastava |

OTHER PUBLICATIONS

International Search Report from PCT/US2014/041604; Lee W. Young; dated Oct. 22, 2014.

\* cited by examiner

METHODS AND SYSTEMS FOR REPRESENTING A DEGREE OF TRAFFIC CONGESTION USING A LIMITED NUMBER OF SYMBOLS

CROSS-REFERENCE

The present application claims priority to International Patent Application No. PCT/RU2013/000471, filed Jun. 7, 2013.

FIELD

The present technology relates to traffic congestion prediction and representation.

BACKGROUND

Road traffic congestion may be particularly problematic in older cities, such as London or Moscow, where the road system was designed long before the advent of automobiles. Road traffic congestion may also be particularly problematic in newer cities, such as New York, that have a dense road network and a very large amount of vehicles using the roads. In either case, in such cities, it is not just the highways that are affected by traffic congestion. Many of the cities' primary, secondary, and tertiary (non-highway) streets may be affected as well. In some cities it is common for large areas of the city's streets to become so congested during various times of the day that gridlock or near gridlock occurs. Unfortunately, while some of the times of such congestion occurring are predictable (e.g. "rush hours"), other times they are not. Similarly, while some of the areas of the city in which such congestion will occur are predictable, others are not. Variation in traffic congestion (timing and location) occurs in a somewhat unpredictable manner from day to day.

As traffic congestion can be unpleasant, inefficient, and wasteful; ideally people would avoid areas in which the traffic is congested if possible. Accordingly, there are many conventional traffic predicting and/or reporting systems that are known in the art. Typically the output of such systems is a map, such as that on the Moscow traffic web page of the Yandex™ website (www.yandex.ru), in which the road network of a given area (in this case Moscow) is shown with various segments of the road network being colored. Typically the color of a segment indicates the level of traffic congestion on that segment, either then currently or as a prediction of some time in the future. In the case of the Yandex map referred to above, the map shows then current traffic congestion in respect of the Moscow road network. As is commonly the case in such systems, red road segments on the map indicate heavy traffic congestion on that road segment, yellow road segments on the map indicate light traffic congestion on that road segment, and green road segments on the map indicate no traffic congestion on that road segment.

While conventional traffic predicting and/or reporting systems such as that described above are adequate for their intended purposes, additional improvements are possible and might be useful in certain circumstances.

SUMMARY

It thus is an object of the present technology to provide for improved traffic prediction and reporting, at least as compared with some of the prior art.

Typically an inhabitant of a city has a choice to use different forms of transportation (e.g. personal car, taxi, bus, metro/subway, bike, walk, etc.). Their choice to use their own personal car or a taxi (for example) as a method of transportation on any given day and time may depend on the level of traffic congestion in the city during the times at which they need to get around. One of the difficulties with conventional traffic prediction and reporting systems such as that referred to above, however, is such systems' inability to provide a quick answer to the questions: "What's the traffic (congestion) situation going to be like today?" or "Should I take my car today?"; the answers to which, if known, would likely influence a person's decision as to whether to take their personal car as a means of transport.

An (oversimplified for the purposes of illustration) analogous situation is that of the weather. In the morning, before leaving for work, a person might ask themselves the questions: "Do I need an umbrella today?" or "Do I need a jacket today?". The information provided by some weather services is relatively helpful in this regard. For example, on a web page from The Weather Channel™ website ("www.weather.com") providing the weather in Moscow, Russia. One could easily and quickly see that if it were indeed going to rain today (and thus an umbrella would likely be desirable) and that if it were likely to be relatively warm today (and thus a jacket would not likely be necessary). Thus, the information provided by weather services is generally helpful in making relatively quick and easy decisions about actions that one should or should not take in view of the day's weather. On the other hand, the information provided by traffic services is not at all helpful in the same way. One cannot make quick easy decisions about what actions one should or should not take in view of the day's traffic situation.

The present technology is an attempt at improving traffic congestion prediction and reporting to attempt provide what is believed to be more useful information to users of traffic services. While a level of ease of use such as that of weather reporting may not necessarily be reached through the use of the present technology, it is believed that, at least in some circumstances, the present technology is an improvement over conventional traffic congestion prediction and reporting technology described hereinabove.

In this respect, it is believed that the weather information as described above may be useful owing to its use of a limited number of symbols in providing that information. For example, a day's weather is typically presented via one a simple image representing the forecast (e.g. sun, clouds, rain, snow, etc.) together with a whole number representing the temperature (e.g. 21° C.). If one wanted more detailed information with respect to the weather at different times of the day, most sources provide (usually upon request) a presentation of a number of the aforementioned combinations of images & numbers.

Another characteristic of the conventional presentation of weather information is that weather forecasts are conventionally typically provided for a relatively large area. For example, the typically smallest area in respect of which a weather forecast is provided is for a whole city (e.g. Moscow, London, New York). Weather forecasts are not provided for parts of cities. This is likely in recognition of the fact that typically the weather is generally the same throughout the city over the course of a day (or hour—as the case may be).

One facet of the present technology attempts to loosely analogize traffic prediction and reporting with weather prediction and reporting, and thereby provide a representation of a degree of traffic congestion in a geographic area (e.g. a city) using a limited number of symbol (rather than focus on individual road segments on a map as is conventionally done).

Thus, in a very simple example, via the present technology a simple traffic "forecast" in respect of a city (for example), akin to a weather forecast, may be presented to a viewer in the morning and that person would be able to quickly learn that that day in the city it will be, for example, a "high traffic congestion day" or a "low traffic congestion day". Thus for example, in one implementation, the traffic forecast for a particular day might be "red" or "green" respectively.

Alternatively, in another scenario, several different traffic "forecasts" will be presented to a viewer at one time, the various forecasts being for various times throughout the day. Thus for example, in the morning, a person might be able to quickly learn that that day will have a "high traffic congestion" early morning, a "medium traffic congestion" late morning, a "light traffic congestion" noon hour, a "little traffic congestion" early afternoon, a "heavy traffic congestion" late afternoon, an "extremely heavy congestion" early evening, a "heavy congestion" late evening, and finally a "no traffic congestion" night. Thus, for example, in one implementation, such a daily traffic forecast might consist of a series of colored squares having numbers in them, with the colors representing the degree of traffic congestion during the various time blocks during the day represented by the numbers: RED (7:00-9:00)/ORANGE (9:00-11:00)/YELLOW (11:00-13:00)/GREEN (13:00-15:00)/RED (15:00-17:00)/BLACK (17:00-19:00)/RED (19:00-21:00)/WHITE (21:00-7:00).

In order to provide such a forecast, one needs to create a computerized model allowing one to input various information and have as an output a traffic forecast. Thus, another facet of the present technology is concerned with creating such a model, i.e. a computerized model for computing values representative of traffic congestion in respect of a geographic area for use in representing a degree of traffic congestion in the geographic area using a limited number of symbols.

Thus, in one aspect, some implementations of the present technology provide a method of creating a computerized model for computing values representative of traffic congestion in respect of a geographic area for use in representing a degree of traffic congestion in the geographic area using a limited number of symbols, the method comprising:
  retrieving, by at least one server from at least one database, historical traffic data in respect of roads within geographic area, the retrieved historical traffic data including data over a course of a first period of time in respect of second periods of time within the first period of time;
  retrieving, by the at least one server from the at least database, values representative of traffic congestion in respect of roads within the geographic area for the second periods of time; and
  deriving, via the at least one server, a computerized model for computing values representative of traffic congestion in respect of roads within the geographic area for third periods of time, the computerized model being based on the retrieved historical traffic data and the retrieved values representative of traffic congestion in respect of the geographic area for the second periods of time.

In some implementations, the retrieved values representative of traffic congestion in respect of the geographic area for the second periods of time are whole numbers between zero and ten inclusive.

In some implementations, the first period of time is at least one year.

In some implementations, the second periods of time are hours.

In some implementations the third periods of time are hours.

In some implementations, the retrieved historical traffic data includes data related to at least one of average vehicle speed and average vehicle transit time in respect of roads within the geographic area.

In some implementations, the method further comprises, retrieving, by the at least one server from the at least one database, road characteristic data in respect of roads within the geographic area, the retrieved road characteristic data including road traffic congestion contribution factors in respect of roads within the geographic area; and the computerized model is further based on the retrieved road characteristic data.

In some implementations, the retrieved road traffic congestion contribution factors are whole numbers between zero and ten inclusive.

In some implementations, the method further comprises, retrieving, by the at least one server from the at least one database, historical weather data in respect of the geographic area over the course of a first period of time, the retrieved historical weather data including data related to date and time; and the computerized model is further based on the retrieved historical weather data.

In some implementations, the retrieved historical weather data includes data related to at least two of temperature, relative humidity, barometric pressure, and cloud cover.

In some implementations, the method further comprises, retrieving, by the at least one server from the at least one database, weather relevance factors in respect of the retrieved historical weather data; and the computerized model is further based on the retrieved weather relevance factors.

In some implementations, the retrieved weather relevance factors are whole numbers between zero and ten inclusive.

In some implementations, deriving, via the at least one server, the computerized model for computing values representative of traffic congestion in respect of the geographic area for the third periods of time includes employing mathematical statistical analytic techniques.

In some implementations, deriving, via the at least one server, the computerized model for computing values representative of traffic congestion in respect of the geographic area for the third periods of time includes training an artificial neural network.

In another aspect, some implementations of the present technology provide: a method of representing a degree of traffic congestion in a geographic area using a limited number of symbols:
  receiving, by the at least one server, recent traffic data and recent weather data in respect of one of the third periods of time, the recent traffic data including at least one of recent average vehicle speed and recent average vehicle transit time in respect of a limited number of predetermined roads with the geographic area, the recent weather data including data in respect of at least two of temperature, relative humidity, barometric pressure, and cloud cover;

computing a value representative of the traffic congestion in respect of the one of the third periods of time by the at least one server using the recent traffic data and the recent weather data and a trained artificial neural network as described hereinabove.

In some implementations, the value representative of the traffic congestion is one of the limited number of symbols.

In some implementations, the method further comprises assigning to the computed value representative of the traffic congestion one of the limited number of symbols by the at least one server.

In some implementations, the method further comprises, sending, by the at least one server to a client device, the one of the limited number of symbols.

In some implementations, the one of the limited number of symbols is a whole number between zero and ten inclusive.

In another aspect, some implementations of the present technology provide a method of representing a degree of traffic congestion in a geographic area using a limited number of symbols:
  receiving, by the at least one server, recent traffic data and recent weather data in respect of one of the third periods of time, the recent traffic data including at least one of recent average vehicle speed and recent average vehicle transit time in respect of a limited number of predetermined roads with the geographic area, the recent weather data including recent weather data and recent weather prediction data related to at least two of temperature, relative humidity, barometric pressure, and cloud cover;
  computing a plurality of value representatives of the traffic congestion in respect of the one of the third periods of time by the at least one server using the recent traffic data and the recent weather data and a corresponding plurality of trained artificial neural networks as described hereinabove; and
  computing an average value representative of the traffic congestion in respect of the one of the third periods of time, by the at least one server, from the plurality of values representative of the traffic congestion in respect of the one of third periods of time.

In some implementations, the average value representative of the traffic congestion is one of the limited number of symbols.

In some implementations, the method further comprises assigning to the computed average value representative of the traffic congestion one of the limited number of symbols by the at least one server.

In some implementations, the method further comprises, sending, by the at least one server to a client device, the one of the limited number of symbols.

In some implementations, the one of the limited number of symbols is a whole number between zero and ten inclusive.

In another aspect, some implementations of the present invention provide a method of representing a degree of traffic congestion in a geographic area using a limited number of symbols:
  receiving, by the at least one server, recent traffic data and recent weather data in respect of a first one of the third periods of time, the recent traffic data including at least one of recent average vehicle speed and recent average vehicle transit time in respect of a limited number of predetermined roads with the geographic area, the recent weather data including recent weather data and recent weather prediction data related to at least two of temperature, relative humidity, barometric pressure, and cloud cover;
  computing a first value representative of the traffic congestion in respect of the first one of the third periods of time by the at least one server using the recent traffic data and the recent weather data and a first trained artificial neural network as described hereinabove;
  computing a second value representative of the traffic congestion in respect of the second one of the third periods of time by the at least one server using the recent traffic data and the recent weather data and a second trained artificial neural network of claim 14; and
  computing a third value representative of the traffic congestion in respect of the third one of the third periods of time by the at least one server using the recent traffic data and the recent weather data and a third trained artificial neural network of claim 14.

In some implementations, each of the artificial neural networks has been independently-trained.

In some implementations, the first value representative of the traffic congestion in respect of the first one of the third periods of time, the second value representative of the traffic congestion in respect of the second one of the third periods of time, and the third value representative of the traffic congestion in respect of the third one of the third periods of time, are each ones of the limited number of symbols.

In some implementations, the method further comprises, assigning, by the at least one server, ones of the limited number of symbols to the computed first value representative of the traffic congestion in respect of the first one of the third periods of time, the computed second value representative of the traffic congestion in respect of the second one of the third periods of time, and the computed third value representative of the traffic congestion in respect of the third one of the third periods of time.

In some implementations, the method further comprises, sending, by the at least one server to a client device, the ones of the limited number of symbols.

In some implementations, the ones of the limited number of symbols are each a whole number between zero and ten inclusive.

In another aspect, some implementations of the present technology provide a method of representing a degree of traffic congestion in a geographic area using a limited number of symbols:
  receiving, by the at least one server, recent traffic data and recent weather data in respect of a first one of the third periods of time, the recent traffic data including at least one of recent average vehicle speed and recent average vehicle transit time in respect of a limited number of predetermined roads with the geographic area, the recent weather data including recent weather data and recent weather prediction data related to at least two of temperature, relative humidity, barometric pressure, and cloud cover;
  computing a first plurality of values representative of the traffic congestion in respect of the first one of the third periods of time by the at least one server using the recent traffic data and the recent weather data and a first plurality of independently-trained artificial neural networks as described hereinabove;
  computing a first average value representative of the traffic congestion in respect of the first one of the third periods of time, by the at least one server, from the first plurality of values representative of the traffic congestion in respect of the first one of third periods of time;
computing a second plurality of values representative of the traffic congestion in respect of the second one of the third periods of time by the at least one server using the recent traffic data and the recent weather data and a second plurality of independently-trained artificial neural networks as described hereinabove;
computing a second average value representative of the traffic congestion in respect of the second one of the third periods of time, by the at least one server, from the second plurality of values representative of the traffic congestion in respect of the second one of third periods of time; and computing a third plurality of values representative of the traffic congestion in respect of the third one of the third periods of time by the at least one server using the recent traffic data and the recent weather data and a third plurality of independently-trained artificial neural networks as described hereinabove; and
computing a third average value representative of the traffic congestion in respect of the third one of the third periods of time, by the at least one server, from the third plurality of values representative of the traffic congestion in respect of the third one of third periods of time.

In some implementations, wherein the first average value representative of the traffic congestion in respect of the first one of the third periods of time, the second average value representative of the traffic congestion in respect of the second one of the third periods of time, and the third average value representative of the traffic congestion in respect of the third one of the third periods of time, are each ones of the limited number of symbols.

In some implementations, the method further comprises, assigning, by the at least one server, ones of the limited number of symbols to the computed first average value representative of the traffic congestion in respect of the first one of the third periods of time, the computed second average value representative of the traffic congestion in respect of the second one of the third periods of time, and the computed average third value representative of the traffic congestion in respect of the third one of the third periods of time.

In some implementations, the method further comprises, sending, by the at least one server to a client device, the ones of the limited number of symbols.

In some implementations, the ones of the limited number of symbols are each a whole number between zero and ten inclusive.

In another aspect, in some implementations, the present technology provides a method of representing a degree of traffic congestion in a geographic area using a limited number of symbols:
receiving, by the at least one server, recent traffic data and recent weather data in respect of a first one of the third periods of time, the recent traffic data including at least one recent average vehicle speed and recent average vehicle transit time in respect of a limited number of predetermined roads with the geographic area, the recent weather data including recent weather data and recent weather prediction data related to at least two of temperature, relative humidity, barometric pressure, and cloud cover;
computing a first plurality of values representative of the traffic congestion in respect of the first one of the third periods of time by the at least one server using the recent traffic data and the recent weather data and a first plurality of independently-trained artificial neural networks as described hereinabove;
computing a first average value representative of the traffic congestion in respect of the first one of the third periods of time, by the at least one server, from the first plurality of values representative of the traffic congestion in respect of the first one of third periods of time; and
computing a second plurality of values representative of the traffic congestion in respect of the second one of the third periods of time by the at least one server using the recent traffic data and the recent weather data and a second plurality of independently-trained artificial neural networks as described hereinabove;
computing a second average value representative of the traffic congestion in respect of the second one of the third periods of time, by the at least one server, from the second plurality of values representative of the traffic congestion in respect of the second one of third periods of time; and
computing a third plurality of values representative of the traffic congestion in respect of the third one of the third periods of time by the at least one server using the recent traffic data and the recent weather data and a third plurality of independently-trained artificial neural networks as described hereinabove;
computing a third average value representative of the traffic congestion in respect of the third one of the third periods of time, by the at least one server, from the third plurality of values representative of the traffic congestion in respect of the third one of third periods of time;
receiving, by the at least one server, updated traffic data and updated weather data, the updated traffic data including at least one of an updated vehicle speed and an updated vehicle transit time in respect of a limited number of predetermined roads with the geographic area, the updated weather data including updated weather data and updated weather prediction data related to at least two of temperature, relative humidity, barometric pressure, and cloud cover;
computing a fourth plurality of values representative of the traffic congestion in respect of the second one of the third periods of time by the at least one server using the updated traffic data and the updated weather data and a fourth plurality of independently-trained artificial neural networks as described hereinabove;
computing a fourth average value representative of the traffic congestion in respect of the second one of the third periods of time, by the at least one server, from the fourth plurality of values representative of the traffic congestion in respect of the second one of third periods of time; and
computing a fifth plurality of values representative of the traffic congestion in respect of the third one of the third periods of time by the at least one server using the updated traffic data and the updated weather data and a fifth plurality of independently-trained artificial neural networks as described hereinabove;
computing a fifth average value representative of the traffic congestion in respect of the third one of the third periods of time, by the at least one server, from the fifth plurality of values representative of the traffic congestion in respect of the third one of third periods of time; and
computing a sixth plurality of values representative of the traffic congestion in respect of a fourth one of the third periods of time by the at least one server using the updated traffic data and the updated weather data and a sixth plurality of independently-trained artificial neural networks as described hereinabove; and computing a sixth average value representative of the traffic congestion in respect of the fourth one of the third periods of time, by the at least one server, from the sixth plurality of values representative of the traffic congestion in respect of the fourth one of third periods of time.

In some implementations, the first average value representative of the traffic congestion in respect of the first one of the third periods of time, the second average value representative of the traffic congestion in respect of the second one of the third periods of time, the third average value representative of the traffic congestion in respect of the third one of the third periods of time, the fourth average value representative of the traffic congestion in respect of the second one of the third periods of time, the fifth average value representative of the traffic congestion in respect of the third one of the third periods of time, and the sixth average value representative of the traffic congestion in respect of the fourth one of the third periods of time are each ones of the limited number of symbols.

In some implementations, the method further comprises assigning, by the at least one server, ones of the limited number of symbols to the computed first average value representative of the traffic congestion in respect of the first one of the third periods of time, the computed second average value representative of the traffic congestion in respect of the second one of the third periods of time, the computed third average value representative of the traffic congestion in respect of the third one of the third periods of time, the computer fourth average value representative of the traffic congestion in respect of the second one of the third periods of time, the computed fifth average value representative of the traffic congestion in respect of the third one of the third periods of time, and the computed sixth average value representative of the traffic congestion in respect of the fourth one of the third periods of time.

In some implementations, the method further comprises, prior to receiving by the at least one server updated traffic data and updated weather data, sending, by the at least one server to a client device, the ones of the limited number of symbols in respect of the computed first average value, the computed second average value, and the computed third average value; and sending, by the at least one server to the client device, the ones of the limited number of symbols in respect of the computed fourth average value, the computed fifth average value, and the computed sixth average value.

In some implementations, ones of the limited number of symbols are each a whole number between zero and ten inclusive.

In another aspect, in some implementations, the present technology provides a method of presenting a degree of traffic congestion in a geographic area using a limited number of symbols, comprising: sending, by at least one server to a client device, a first one of the limited number of symbols in respect of a computed first value representative of the traffic congestion for a first period of time, a second one of the limited number of symbols in respect of a computed second value representative of the traffic congestion for a second period of time immediately following the first period of time, and third one of the limited number of symbols in respect of a computed third value representative of the traffic congestion in respect of a third period of time immediately following the second period of time.

In some implementations, the first one of the limited number of symbols, the second one of the limited number of symbols, and the third one of the limited number of symbols are each a whole number between zero and ten inclusive.

In the context of the present specification, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present invention will become apparent from the following description, the accompanying drawings and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

Described below is one implementation of the present technology. Thus, the description thereof that follows is intended to be only a description of illustrative examples of the present technology. This description is not intended to define the scope or set forth the bounds of the present technology. In some cases, what are believed to be helpful examples of modifications may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the description below may provide a simple implementation of the present technology, and that where such is the case it has been presented in this manner as an aid to understanding. As persons skilled in the art would understand, various implementations of the present technology may be of a greater complexity.

Figure 1:
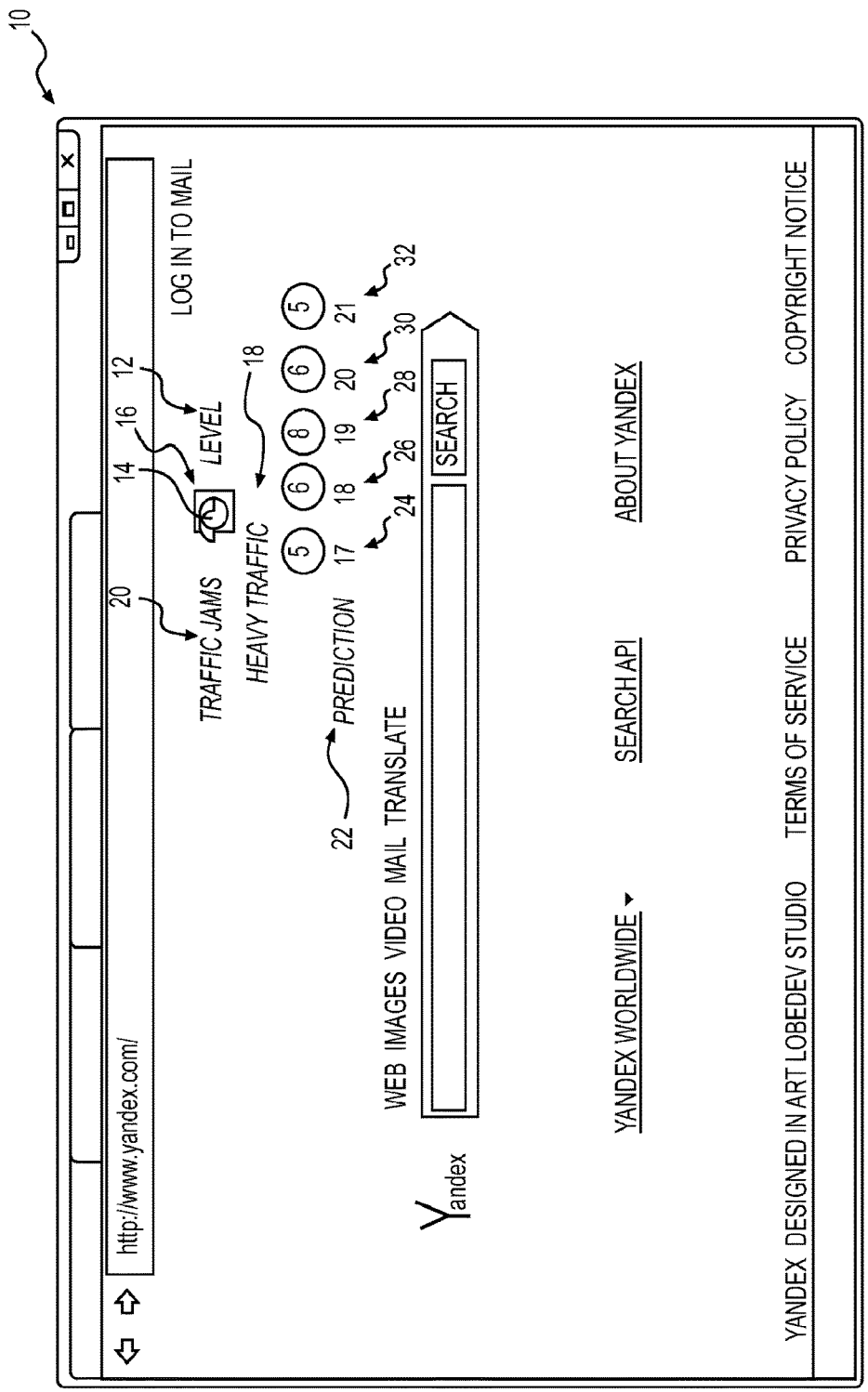
FIG. 1 is an image of a web page of the Yandex search engine showing an implementation of the present technology.

Referring to FIG. 1, there is shown a simplified version of the home page 10 of the Yandex™ search engine (www.yandex.ru) (translated into the English language) having one implementation of the present technology. In this implementation, a then current degree of "пробки" ("Traffic Congestion") 20 in the city of Moscow, Russia is shown as represented by the whole numbers 0 to 10 (inclusive). Thus, on the home page 10 in FIG. 1, the then current degree of traffic congestion is "Level 5" 12—"Heavy Traffic" 18. In addition, along with one of the whole numbers from 0 to 10 a colored-in circle 14 is presented to viewers (in what looks like a traffic light with a single lamp 16). When the degree of traffic is, or is projected to be, 0 to 3, the colored-in circle is green. In this implementation, when the degree of traffic is, or is projected to be, 4 to 7, the colored-in circle is yellow. When the degree of traffic is, or is projected to be, 8 to 10, the colored-in circle is red. Thus, on the home page 10 in FIG. 1, the coloured-in circle 14 is yellow. In this implementation, the presentation of the then current or recent (e.g. within the previous 2 hours) degree of traffic congestion is reported 24-hours per day.

Further, in this implementation, on each hour between (and including) the hours of 07:00 and 22:00, a future prediction of traffic information for each of the then following four (4) hours is made and presented on the home page 10. The information shown on home page 10 in FIG. 1 is at the time of 17:00. Thus, also shown on the home page 10 is a representation 22 of the then current degree of traffic congestion at 17:00 being a number (as described above) within a coloured circle (having a colour from the pattern as described above) 24, along with 4 representations of the predicted degrees of traffic congestion, one for each of the next 4 hours (also shown in this manner) 26, 28, 30, 32 (respectively).

In this implementation, the then current degree of traffic congestion on which representation 22 is based is taken from actual data; it is not a predicted value. Also in this implementation, at each hour from 07:00 to 22:00 a prediction of the degree of traffic congestion is made for the following four hours; i.e. at 17:00 the prediction is made for the degree of traffic congestion at 18:00, at 19:00, at 20:00 and at 21:00. It is these predictions that representations 26, 28, 30, 32 represent. Thus at 17:00 there is shown a (first) representation 24 of the current degree of traffic congestion, a (second) representation 26 of the then predicted (i.e. at 17:00) degree of traffic congestion at 18:00, a (third) representation 28 of the then predicted (i.e. at 17:00) degree of traffic congestion at 19:00, a (fourth) representation 30 of the then predicted (i.e. at 17:00) degree of traffic congestion at 20:00, and a (fifth) representation 32 of the then predicted (i.e. at 17:00) degree of traffic congestion at 21:00.

As was discussed above, in this implementation, the above described presentation and prediction of the traffic situation starts at 07:00. Thus starting at 07:00, shown on the home page 10 of the Yandex website, is a representation of the then current degree of traffic congestion at 07:00 (in the manner described above), along with 4 representations of the predicted degrees of traffic congestion, one for each of the then next 4 hours (also shown in the manner described above). Thus at 7:00 there is shown a (first) representation of the then current degree of traffic congestion, a (second) representation of the then predicted (i.e. at 7:00) degree of traffic congestion at 8:00, a (third) representation of the then predicted (i.e. at 07:00) degree of traffic congestion at 9:00, a (fourth) representation of the then predicted (i.e. at 07:00) degree of traffic congestion at 10:00, and a (fifth) representation of the then predicted (i.e. at 07:00) degree of traffic congestion at 11:00.

In this implementation, at each hour, the traffic information presented on the Yandex website changes and new information is presented. This new information takes into account the then current actual degree of traffic congestion and new traffic predictions based on the then current actual data. In this implementation new predictions of future degrees of traffic congestion do not take into account any prior prediction of a degree of traffic prediction (even if for the same predicted hour in the future). (This avoids a propagation of error from one prediction to the next.) Thus, at 08:00 (on the same day at the 7:00 prediction referred to above), on the home page there will be a representation of the then current degree of traffic congestion at 08:00 (in the manner described above) (based on then actual data), along with the 4 representations of the predicted degrees of traffic congestion, one for each of the then next 4 hours (also shown in the manner described above) (derived from new predictions based on the then actual data). Thus at 08:00 there will be shown a (first) representation of the then current degree of traffic congestion, a (second) representation of the then predicted (i.e. at 08:00) degree of traffic congestion at 09:00, a (third) representation of the then predicted (i.e. at 08:00) degree of traffic congestion at 10:00, a (fourth) representation of the then predicted (i.e. at 08:00) degree of traffic congestion at 11:00, and a (fifth) representation of the then predicted (i.e. at 08:00) degree of traffic congestion at 12:00.

Similarly, at 09:00 the process repeats itself, so there will be a representation of the then current degree of traffic congestion at 09:00 (in the manner described above), along with the 4 representations of the then predicted degrees of traffic congestion, one for each of the next 4 hours (also shown in the manner described above). Thus at 09:00 there will be shown a (first) representation of the then current degree of traffic congestion, a (second) representation of the then predicted (i.e. at 09:00) degree of traffic congestion at 09:00, a (third) representation of the then predicted (i.e. at 09:00) degree of traffic congestion at 10:00, a (fourth) representation of the then predicted (i.e. at 09:00) degree of traffic congestion at 11:00, and a (fifth) representation of the then predicted (i.e. at 09:00) degree of traffic congestion at 12:00.

This progression continues until 22:00. Thus, at 22:00, there will be a representation of the then current degree of traffic congestion at 22:00 (in the manner described above), along with the 4 representations of the then predicted degrees of traffic congestion, one for each of the next 4 hours (also shown in the manner described above). Thus at 22:00 there will be shown a (first) representation of the then current degree of traffic congestion, a (second) representation of the then predicted (i.e. at 22:00) degree of traffic congestion at 23:00, a (third) representation of the then predicted (i.e. at 22:00) degree of traffic congestion at 00:00, a (fourth) representation of the then predicted (i.e. at 22:00) degree of traffic congestion at 01:00 (12 am), and a (fifth) representation of the then predicted (i.e. at 22:00) degree of traffic congestion at 02:00.

At 23:00, as was discussed above, in this implementation, predictions as to then future degrees of traffic situation are no longer made and the only info presented is a representation of the then current actual traffic congestion situation. (This is simply the case as typically the congestion between the hours of 23:00 and 06:00 is relatively manageable without this information.)

The method by which the above noted representations of the degrees of traffic are derived uses what is known in the art as "an artificial neural network" or sometimes simply "a neural network". A neural network is a mathematical model inspired by biological neural networks. In this present implementation, the neural networks used are the "Fast Artificial Neural Network".

Figure 2:
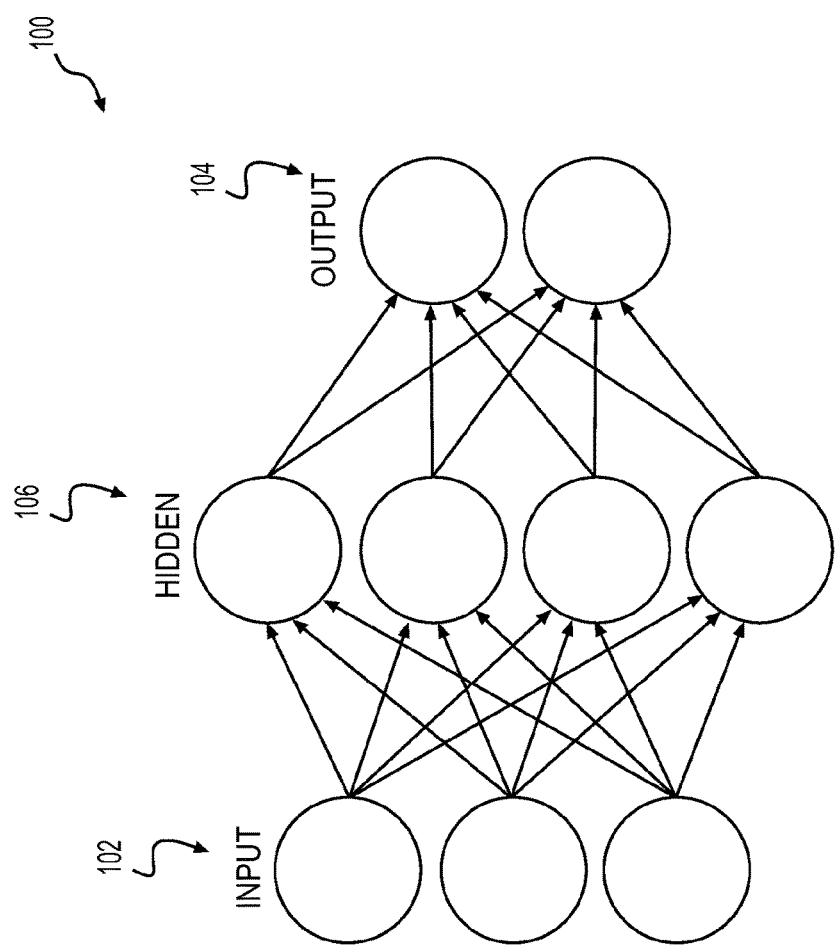
FIG. 2 as a schematic illustrating an artificial neural network used in an implementation of the present technology.

Referring to FIG. 2, a neural network consists of an interconnected group of artificial "neurons", which process information using a connectionist approach to computation. Neural networks are used to model complex relationships between inputs and outputs (without actually knowing the relationships) or to find patterns in data. Neural networks are first conditioned in a learning (or training) phase in which they provided with a known set of "inputs" and a known set of "outputs" based on these inputs (for a given situation that is being attempted to be modelled). During this learning phase, the neural network is will adapt to the situation being learned and change its structure such that the neural network will to be able to provide reasonable predicted outputs for given inputs in a new situation (based on what was learned). Thus rather then try to determine a complex statistical arrangements or mathematical algorithms for a given situation; the neural network tries to provide an "intuitive" answer based on a "feeling" for a situation. A neural network is thus a kind of a trained "black box", which can be used in a situation when what is in the "box" is unimportant; it is only important that the "box" provide reasonable answers to given inputs. FIG. 2 shows a schematic illustration of such a situation. A neural network 100 has a number of "hidden" functionalities (e.g. the "black box") 106 that formulate an output 104 based on a given input 102.

Neural networks are commonly used in many such situations (where it is only important to know an output based on a given input, but exactly how that output is derived is of lesser importance or is unimportant.) For example neural networks are commonly used to optimize the distribution of web-traffic between servers and in data processing, including filtering, clustering, signal separation and compression etc.

Figure 5:
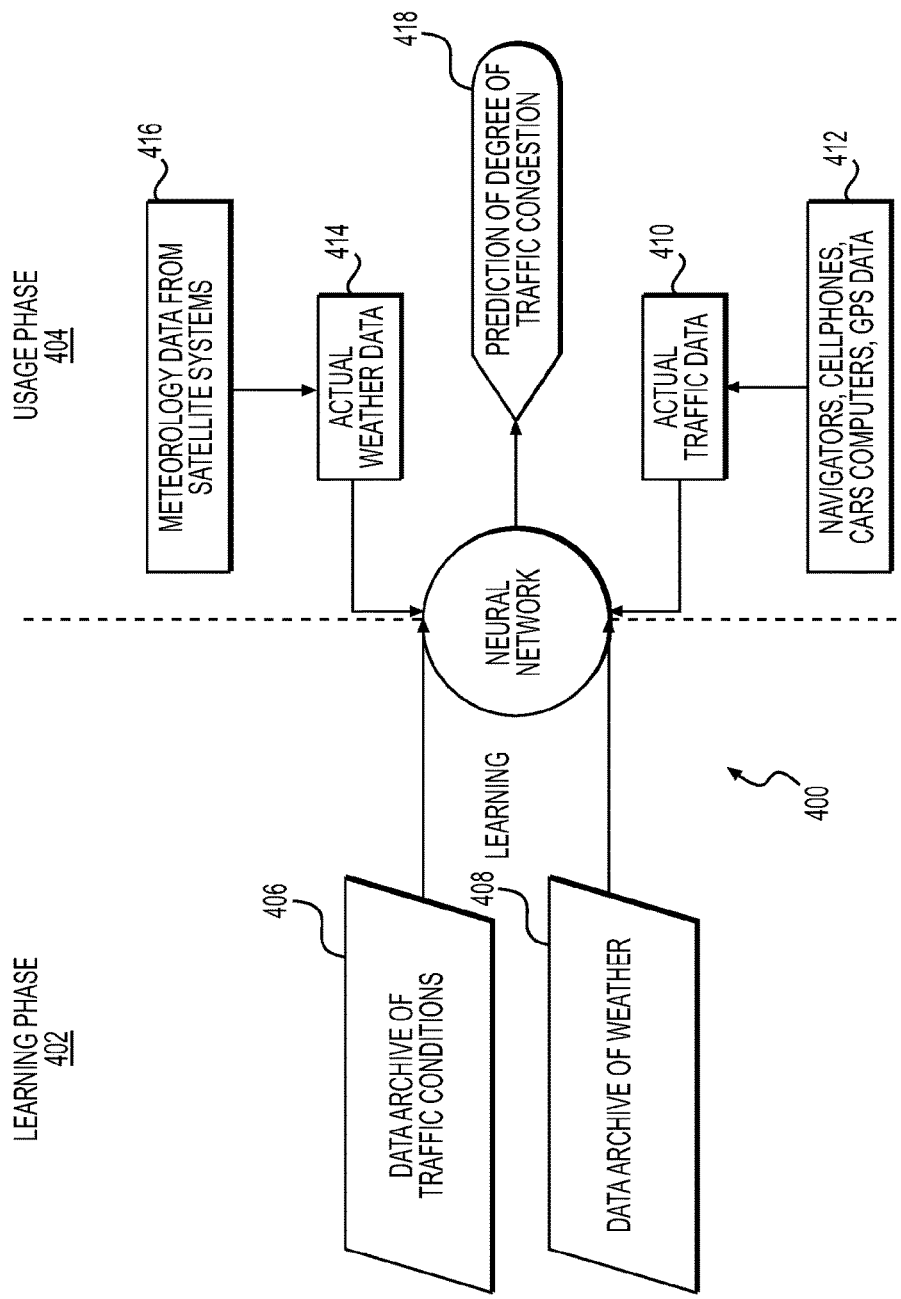
FIG. 5 is a schematic illustrating various input and outputs used in the learning phase and the usage phase of an artificial neural network of an implementation of the present technology.

In summary, referring to FIG. 5, there are always two key steps in working with a neural network 400. First, the network 400 needs to be trained in a training phase 402 (i.e. as was descried above—which also may be described as "machine learning") and thereafter (i.e. once the networks know what data to expect in the input and what data to provide as an output). Then, the network is actually run using real data in a usage phase 404. As an overview, and as will be described in greater detail hereinbelow, a neural network in this implementation of the present technology will be trained using actual data in respect of historical traffic conditions (406) and actual data in respect of historical weather conditions (408). In use, a neural network will be provided with actual traffic data 410 gathered via a variety of sources 412 and with actual weather data 414 gathered via a variety of sources 416, and a prediction of a degree of traffic congestion 418 will be provided.

Figure 3:
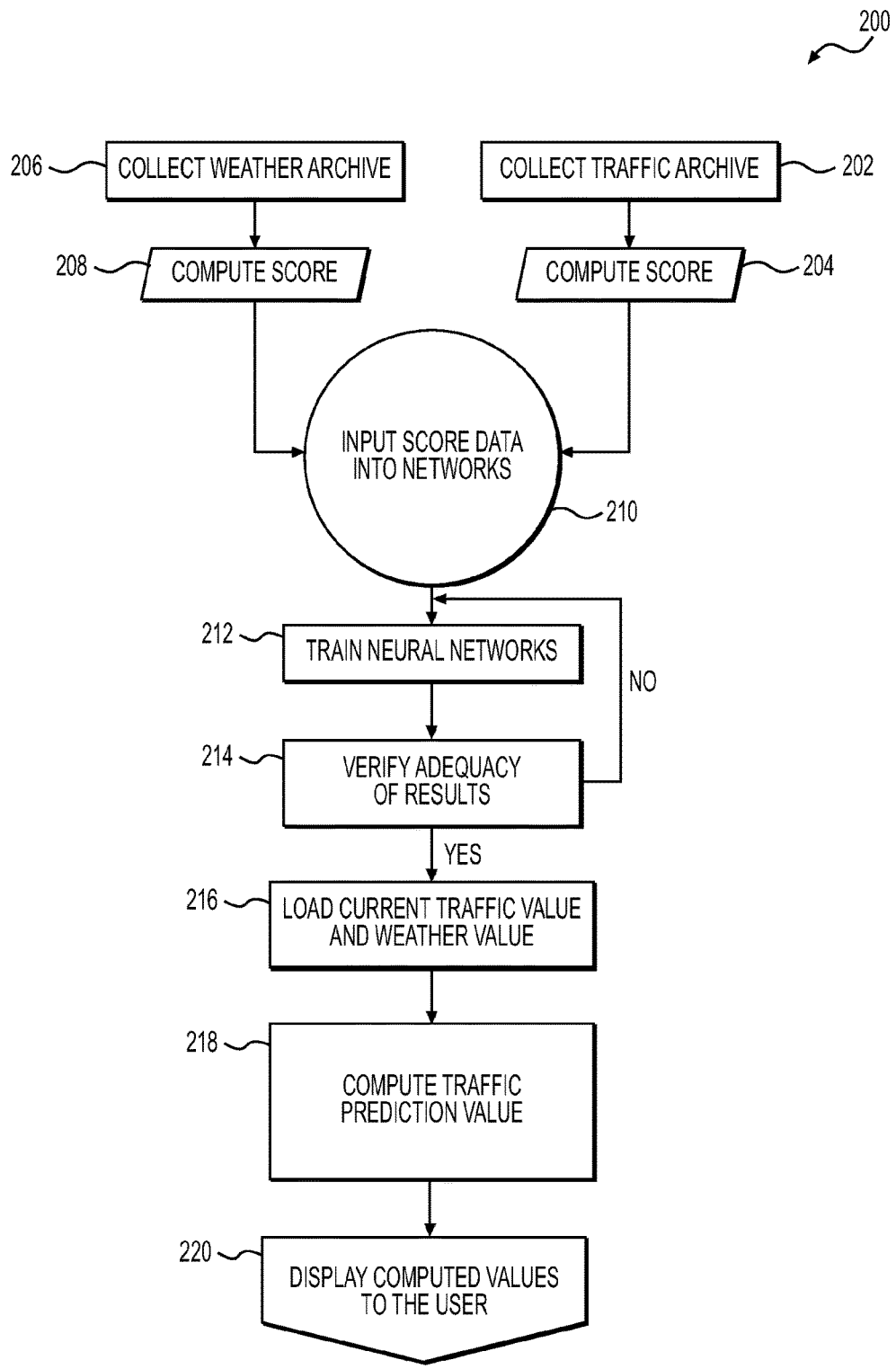
FIG. 3 is a flow chart illustrating the training and use of an artificial neural network in an implementation of the present technology.

Therefore the method by which the above noted representations of the degrees of traffic are derived is first employees a neural network in a training phase. Referring to FIG. 3, in a first step 202, historical traffic data for the Moscow road network for the then past three years (e.g. 2010, 201, 2012) was obtained. This data included data respecting the normal average time-to-pass and the normal average speed-to-pass for all major roadways in the Moscow road network as well as the then current time-to-pass and/or then current average speed for each of those major roadways for each hour of each day during those three years. In a second step 204, that data was manually inspected and for each roadway for each hour of each day a number between 0 to 10 (inclusive) representative of the degree of traffic congestion on that road was assigned. In addition the overall traffic situation in the city was assigned a number between 0 to 10 (inclusive) representative of the overall degree of traffic congestion in the city for each hour of each day. In addition, each roadway was assigned a number between 0 to 10 based on its perceived importance of contribution to the overall degree of traffic congestion in the city.

In this implementation data from every day of each of the three years was included as it was noticed that there is a correlation between the day of the week, the hour of the day, and traffic congestion. For example, for the same hour of the day on a different day of the week (e.g. at 09:00 on a Monday versus at 9 a.m. on a Sunday) the traffic can be quite different.

With respect to number representative of the degree of traffic congestion, in this implementation, the neural networks were trained using three different numbers as a potential outputs for each hour of each day. The three different numbers were a minimum value, a maximum value, and an average value. Thus for example, on Monday, Jan. 25, 2010 at 08:00, a minimum value was 4, a maximum value was 6, and an average value was 5. On Monday, Jan. 25, 2010 at 09:00, a minimum value was 4, a maximum value was 6, and an average value was 4.

The values that were used as outputs during the training of the neural networks were calculated separately before being able to be used. Those values are representative of the relative degree of traffic congestion for the region (in this case the City of Moscow). As was discussed above, calculation of these values takes into consideration a few important aspects, including the normal average time-to-pass and the normal average speed-to-pass for all major roadways in the City of Moscow road network as well as the then current time-to-pass and/or then current average speed for each of those major roadways for each hour of each day during those three years. For example, if the normal average time-to-pass Street A is ten (10) minutes at an average normal speed of 40 km/h, if at a particular time the then average time-to-pass Street A were to be 20 minutes and/or the average normal speed is reduced to 15 km/h, it can be said that traffic is congested on Street A (for whatever reason). A particular value is allocated to these two particular scenarios, i.e. the road when uncongested and the road when congested. As was also discussed above, every major road and street is allocated an "importance" factor that is used to calculate the total score for the given region. This is because the general traffic situation is much more heavily influenced by congestion on an important highway (e.g. a ring road or beltway) than by a side street.

In a third step 206, historical weather data for the previous three years (e.g. 2010, 2011, 2012) was obtained, for three times each day (morning, afternoon, evening). The weather data included then current relative humidity, temperature, barometric pressure, and cloud cover. In a fourth step 208, for each day, the importance of contribution of the weather was assigned a number between 0 to 10 based on its perceived importance to that day/time's weather's effect on the degree of traffic congestion. A value of "0" indicates that the then current weather conditions were perceived to have had relatively no effect on the degree of traffic congestion. A value of "10" indicates that the then current weather conditions were perceived to have had a relatively maximum effect on the degree of traffic congestion.

For example, on Monday, Jan. 25, 2010 in the morning, the relative humidity was 80%, the temperature was −10° C., the barometric pressure was 752 mm Hg, and it was sunny. The weather influence value was "2". (The sunny weather—normal for wintertime mornings in Moscow—was believed to have had very little influence on the degree of traffic congestion.)

On Monday, Jan. 25, 2010 in the afternoon, the relative humidity was 75%, the temperature was −8° C., the barometric pressure was 755 mm Hg, and it was foggy. The weather influence value was "6". (The foggy weather was believed to have had a relatively significant (negative) influence on the degree of traffic congestion. Fog reduces the average speed and thus increases congestion.)

On Monday, Jan. 25, 2010 in the evening, the relative humidity was 81%, the temperature was −12° C., the barometric pressure was 753 mm Hg, and it was snowing. The weather influence value was "9". (The snowy conditions were believed to have at a relatively very serious (negative) effect on the degree of traffic congestion. Snow on the roads reduces the speed of the traffic to a slow crawl and significantly increases traffic congestion.)

In a fifth step 210 all of the above data was input into two hundred and twenty-five (225) independent neural networks (i.e. separate and discrete neural networks), which were then each trained separately (in a sixth step 212) as follows. For each hour between the hours of 07:00 and 22:00, fifteen (15) (of the 225) independent neural networks were assigned to be used at that hour. Thus fifteen of the networks were assigned to be used at 07:00, a different fifteen of the networks were assigned to be used at 08:00, a still different fifteen of the networks were assigned to be used at 09:00, and so on.

For each of the hours, the fifteen (15) networks assigned to be used at that hour were further assigned as follows: (I) Three (3) of the independent networks were assigned to provide an output respecting a degree of traffic congestion at then current hour based on then current actual data (at that hour). (II) Three (3) of the independent networks were assigned to provide an output respecting a predicted degree of traffic congestion one (1) hour immediately after the then current hour based on the then current actual data (at that hour). (III) Three (3) of the independent networks were assigned to provide an output respecting a predicted degree of traffic congestion two (2) hours after the then current hour based on then then current actual data (at that hour). (IV) Three (3) of the independent networks were assigned to provide an output respecting a predicted degree of traffic congestion three (3) hours after the then current hour based on the then current actual data (at that hour). (V) Three (3)

of the independent networks were assigned to provide an output respecting a predicted degree of traffic congestion four (4) hours after the then current hour based on the then current actual data.

Thus, for example, a first fifteen of the independent networks are assigned to be used at 07:00. Of those fifteen, (I) three of the independent networks are assigned to provide at 07:00 an output representative of the actual then current degree of traffic congestion at based on the data available at 07:00. Each one of these three independent networks provides this output independently of the other two networks. (II) Three of the independent networks are assigned to provide at 07:00 an output representative of a degree of traffic congestion at 08:00 based on the data available at 07:00. Each one of these three independent networks provides this output independently of the other two networks. (III) Three of the independent networks are assigned to provide at 07:00 an output representative of a degree of traffic congestion at 09:00 based on the data available at 07:00. Each one of these three independent networks provides this output independently of the other two networks. (IV) Three of the independent networks are assigned to provide at 07:00 an output representative of a degree of traffic congestion at 10:00 based on the data available at 07:00. Each one of these three independent networks provides this output independently of the other two networks. (V) Three of the independent networks are assigned to provide at 07:00 an output representative of a degree of traffic congestion at 11:00 based on the data available at 07:00. Each one of these three independent networks provides this output independently of the other two networks.

A second fifteen of the independent networks are assigned to be used at 08:00. Of those fifteen, (I) three of the independent networks are assigned to provide at 08:00 an output representative of the actual then current degree of traffic congestion at based on the data available at 08:00. Each one of these three independent networks provides this output independently of the other two networks. (II) Three of the independent networks are assigned to provide at 08:00 an output representative of a degree of traffic congestion at 09:00 based on the data available at 08:00. Each one of these three independent networks provides this output independently of the other two networks. (III) Three of the independent networks are assigned to provide at 08:00 an output representative of a degree of traffic congestion at 10:00 based on the data available at 08:00. Each one of these three independent networks provides this output independently of the other two networks. (IV) Three of the independent networks are assigned to provide at 08:00 an output representative of a degree of traffic congestion at 11:00 based on the data available at 08:00. Each one of these three independent networks provides this output independently of the other two networks. (V) Three of the independent networks are assigned to provide at 08:00 an output representative of a degree of traffic congestion at 12:00 based on the data available at 08:00. Each one of these three independent networks provides this output independently of the other two networks.

Similarly, a third fifteen of the independent networks are assigned to be used at 09:00. Of those fifteen, (I) three of the independent networks are assigned to provide at 09:00 an output representative of the actual then current degree of traffic congestion at based on the data available at 09:00. Each one of these three independent networks provides this output independently of the other two networks. (II) Three of the independent networks are assigned to provide at 09:00 an output representative of a degree of traffic congestion at 10:00 based on the data available at 09:00. Each one of these three independent networks provides this output independently of the other two networks. (III) Three of the independent networks are assigned to provide at 09:00 an output representative of a degree of traffic congestion at 11:00 based on the data available at 09:00. Each one of these three independent networks provides this output independently of the other two networks. (IV) Three of the independent networks are assigned to provide at 09:00 an output representative of a degree of traffic congestion at 12:00 based on the data available at 09:00. Each one of these three independent networks provides this output independently of the other two networks. (V) Three of the independent networks are assigned to provide at 09:00 an output representative of a degree of traffic congestion at 13:00 based on the data available at 07:00. Each one of these three independent networks provides this output independently of the other two networks.

Similarly, a third fifteen of the independent networks are assigned to be used at 09:00. Of those fifteen, (I) three of the independent networks are assigned to provide at 09:00 an output representative of the actual then current degree of traffic congestion at based on the data available at 09:00. Each one of these three independent networks provides this output independently of the other two networks. (II) Three of the independent networks are assigned to provide at 09:00 an output representative of a degree of traffic congestion at 10:00 based on the data available at 09:00. Each one of these three independent networks provides this output independently of the other two networks. (III) Three of the independent networks are assigned to provide at 09:00 an output representative of a degree of traffic congestion at 11:00 based on the data available at 09:00. Each one of these three independent networks provides this output independently of the other two networks. (IV) Three of the independent networks are assigned to provide at 09:00 an output representative of a degree of traffic congestion at 12:00 based on the data available at 09:00. Each one of these three independent networks provides this output independently of the other two networks. (V) Three of the independent networks are assigned to provide at 09:00 an output representative of a degree of traffic congestion at 13:00 based on the data available at 09:00. Each one of these three independent networks provides this output independently of the other two networks.

The above division of neural networks continues the last fifteen networks have been assigned to be used at 22:00 in this implementation.

Figure 4:
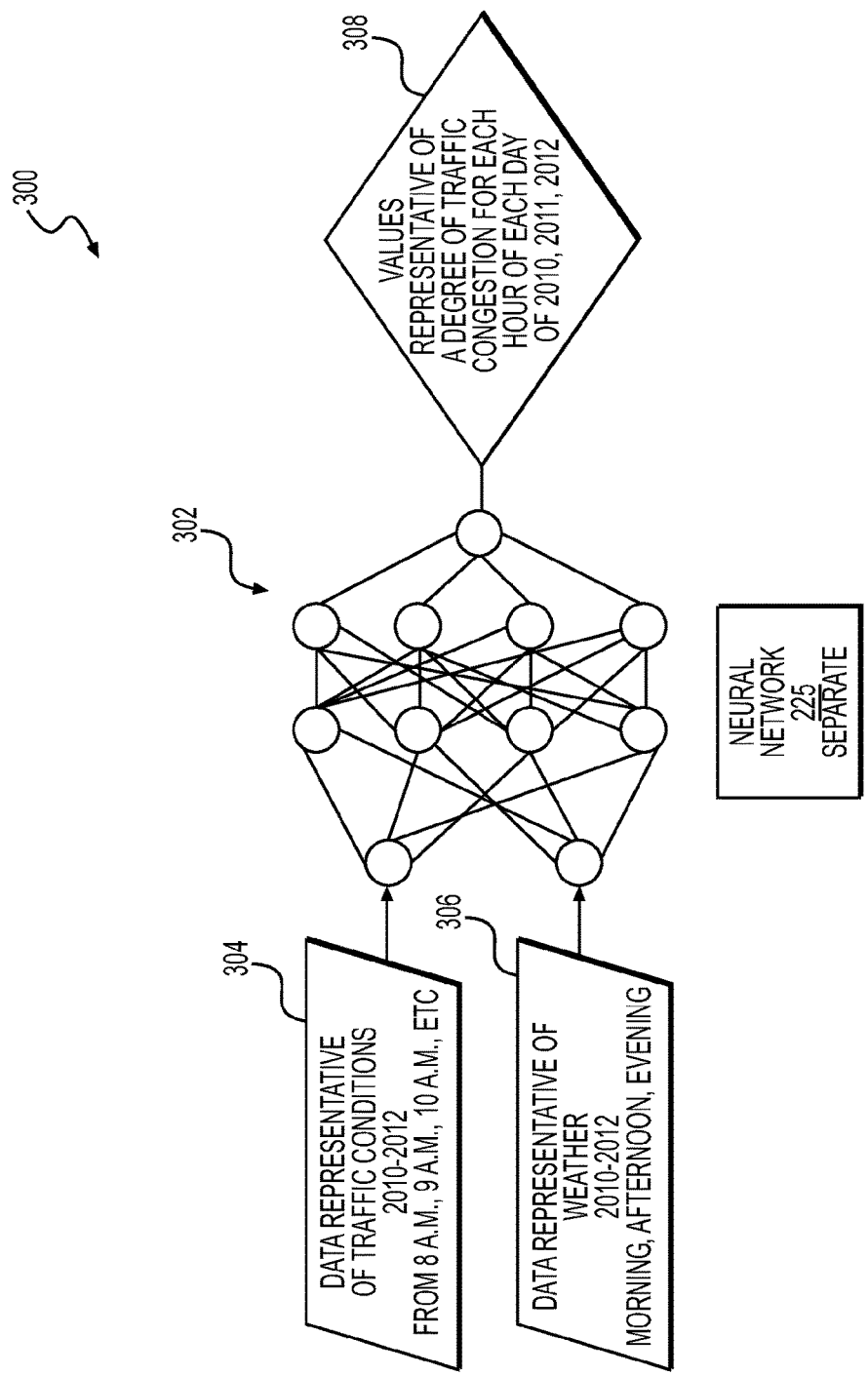
FIG. 4 is a schematic illustrating inputs and outputs used in training an artificial neural network of an implementation of the present technology.

Referring to FIG. 4, each neural network 302 was then trained using the traffic data 304 (as described above) and weather data 306 (as described above) from the hour at which it assigned to be used (for each day of the three years) as an input, and with the actual traffic situation for its assigned hour of predicated degree of traffic congestion 308 as an output. Thus, for example, taking 07:00 as an example, as was described above (I) three (3) of the independent networks were independently trained using the traffic and weather data at 07:00 every date of the three years as inputs and numbers representing the actual degree of traffic congestion at 07:00 for every day of the three years as an output. In the present context "independently trained" means that each one of the three neural networks was provided the same input and output during the training without reference to the other two of the neural networks. (II) Three (3) of the independent networks were independently trained using the traffic and weather data at 07:00 every date of the three years as inputs and numbers representing the actual degree of traffic congestion at 08:00 for every day of the three years as an output. (III) Three (3) of the independent networks were independently trained using the traffic and weather data at 07:00 every date of the three years as inputs and numbers representing the actual degree of traffic congestion at 09:00 for every day of the three years as an output. (IV) Three (3) of the independent networks were independently trained using the traffic and weather data at 07:00 every date of the three years as inputs and numbers representing the actual degree of traffic congestion at 10:00 for every day of the three years as an output. (V) Three (3) of the independent networks were independently trained using the traffic and weather data at 07:00 every date of the three years as inputs and numbers representing the actual degree of traffic congestion at 11:00 for every day of the three years as an output.

For 08:00 (I) three (3) of the independent networks were independently trained using the traffic and weather data at 08:00 every date of the three years as inputs and numbers representing the actual degree of traffic congestion at 08:00 for every day of the three years as an output. In the present context "independently trained" means that each one of the three neural networks was provided the same input and output during the training without reference to the other two of the neural networks. (II) Three (3) of the independent networks were independently trained using the traffic and weather data at 08:00 every date of the three years as inputs and numbers representing the actual degree of traffic congestion at 09:00 for every day of the three years as an output. (III) Three (3) of the independent networks were independently trained using the traffic and weather data at 08:00 every date of the three years as inputs and numbers representing the actual degree of traffic congestion at 10:00 for every day of the three years as an output. (IV) Three (3) of the independent networks were independently trained using the traffic and weather data at 08:00 every date of the three years as inputs and numbers representing the actual degree of traffic congestion at 11:00 for every day of the three years as an output. (V) Three (3) of the independent networks were independently trained using the traffic and weather data at 08:00 every date of the three years as inputs and numbers representing the actual degree of traffic congestion at 12:00 for every day of the three years as an output.

For 09:00 (I) three (3) of the independent networks were independently trained using the traffic and weather data at 09:00 every date of the three years as inputs and numbers representing the actual degree of traffic congestion at 09:00 for every day of the three years as an output. In the present context "independently trained" means that each one of the three neural networks was provided the same input and output during the training without reference to the other two of the neural networks. (II) Three (3) of the independent networks were independently trained using the traffic and weather data at 09:00 every date of the three years as inputs and numbers representing the actual degree of traffic congestion at 10:00 for every day of the three years as an output. (III) Three (3) of the independent networks were independently trained using the traffic and weather data at 09:00 every date of the three years as inputs and numbers representing the actual degree of traffic congestion at 11:00 for every day of the three years as an output. (IV) Three (3) of the independent networks were independently trained using the traffic and weather data at 09:00 every date of the three years as inputs and numbers representing the actual degree of traffic congestion at 12:00 for every day of the three years as an output. (V) Three (3) of the independent networks were independently trained using the traffic and weather data at 09:00 every date of the three years as inputs and numbers representing the actual degree of traffic congestion at 13:00 for every day of the three years as an output.

The training of the remaining neural networks continues in the above fashion until each of the 225 neural networks is adequately trained (i.e. each neural network provide adequate results—step 214).

It can be seen from the above description that in this implementation, for any given calculation to be made, there are three separate independently-trained neural networks performing the calculation in parallel. The purpose of this is to reduce errors that may occur in the calculation performed by any one individual neural network and to avoid the accumulation of errors between the networks and to increase accuracy of traffic prediction. Thus, the 225 independent networks may be thought of as being divided into three (3) separate redundant systems of networks, with one neural network in each system performing all of the calculation that are required in operation of this implementation of the present technology. Thus each of the three systems would have fifteen (15) sub-systems, with one sub-system active in respect of each hour of the day from 07:00 to 22:00 in which calculations are made. Each of the fifteen (15) sub-systems have five (5) neural networks (one for the then current hour, and four for each of the four future hours for which calculations will be made). This is simply another way of visually the grouping of the 225 neural networks.

There is nothing critical about having three separate independently-trained neural networks performing the calculation in parallel. In other implementations there could be two, four, five, etc. this constituting two, four, or five, etc. systems of networks. Any number of permutations is possible.

In this implementation, the three outputs of each of the three neural networks calculating the exact same measurement are averaged and rounded to the nearest whole number. It is that rounded whole number that is taken as the result of the number to be calculated.

Figure 7:
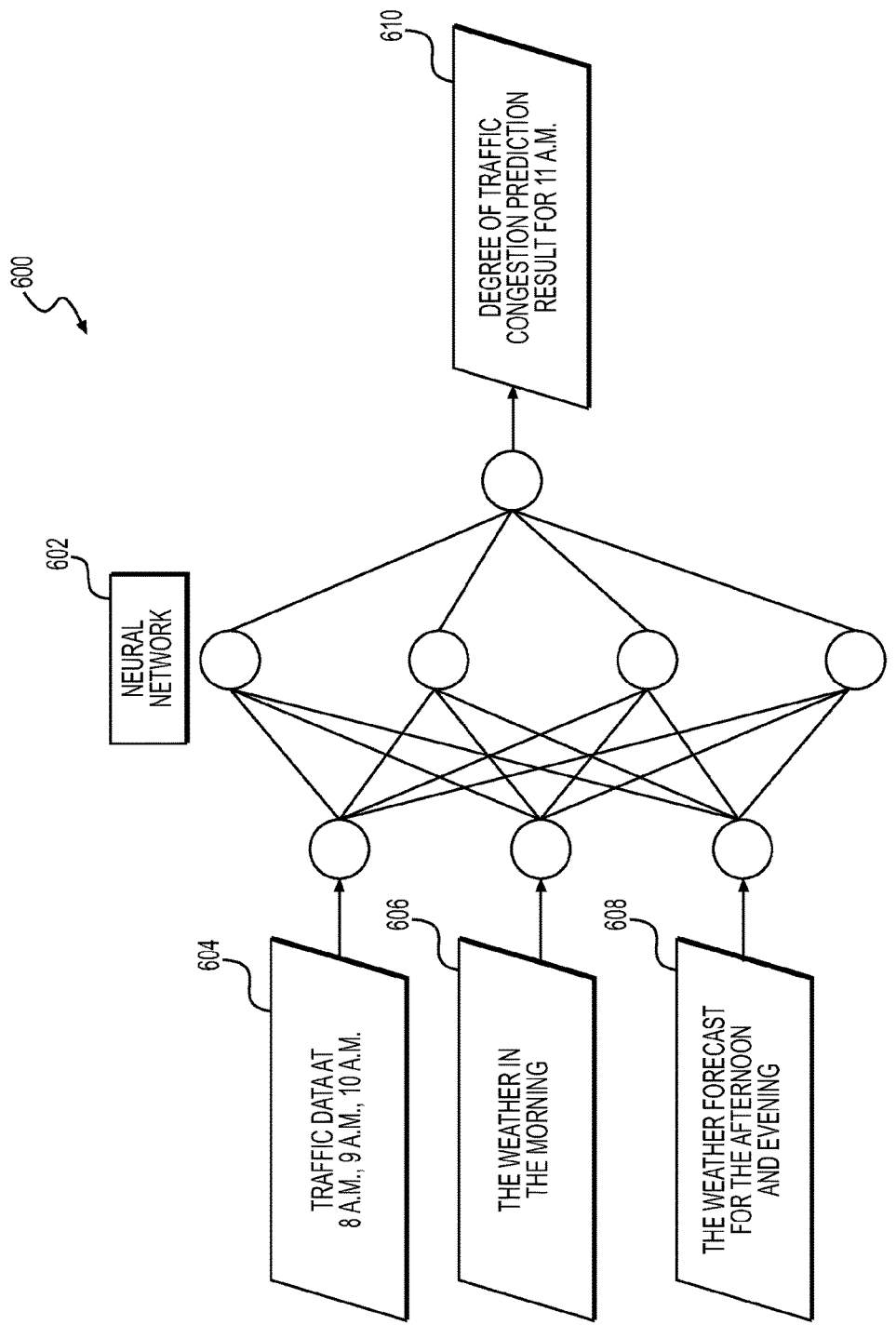
FIG. 7 is a schematic illustrating the usage of an artificial neural network of an implementation of the present technology and its inputs and outputs.
Figure 8:
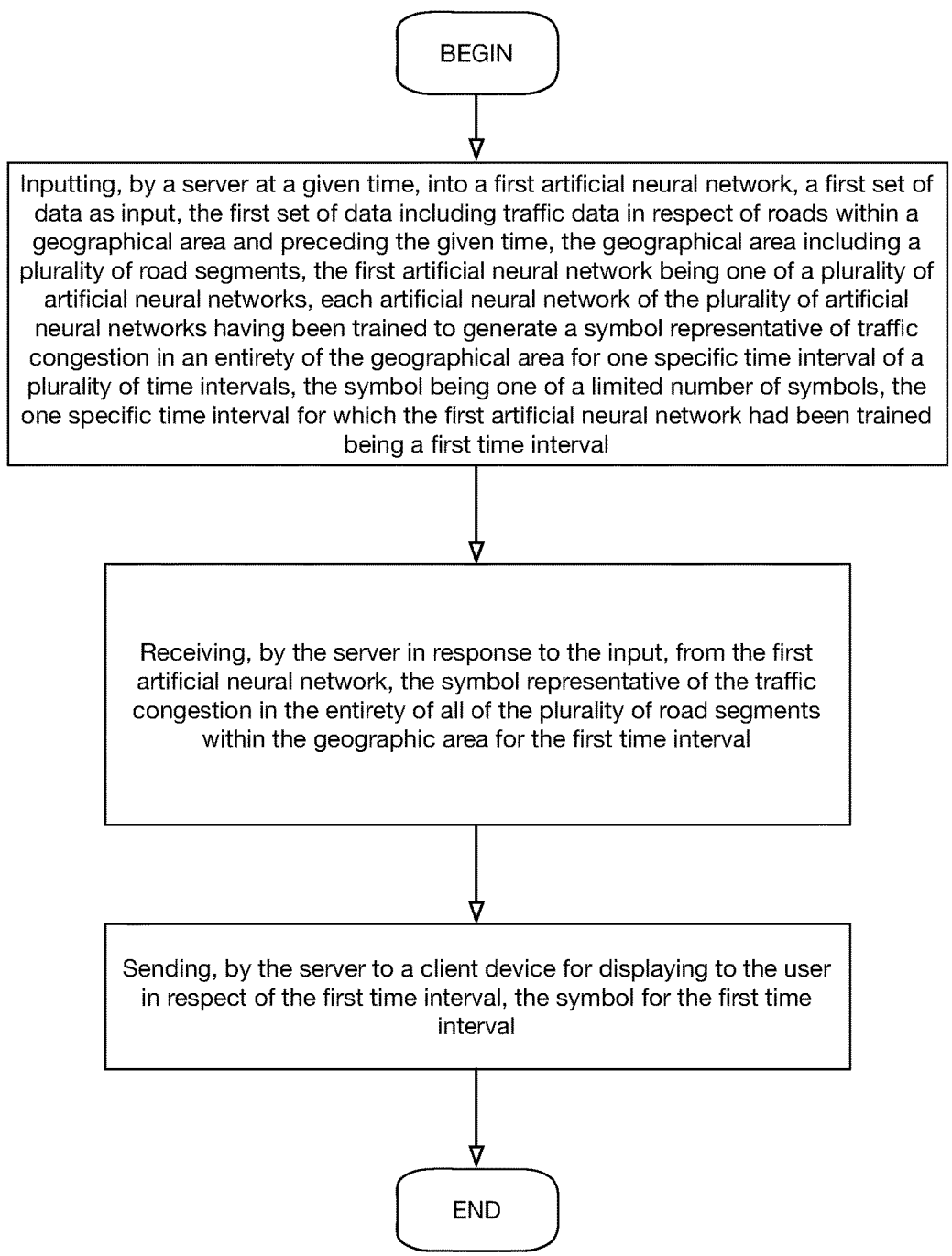
FIG. 8 is a schematic illustrating a method of presenting traffic congestion to a user in accordance with an implementation of the present technology.

In use, on any day for any hour between the hours of 07:00 and 22:00, the 15 independent neural networks for that hour are fed the then current traffic and weather data. This is illustrated in FIG. 7. Thus, in respect of a calculation to be done at 10:00 in respect of a reprehensive value of a degree of traffic congestion at 11:00 610 (for example), the following are input into a neural network 602: Data representative of the actual traffic conditions at 7:00; at 8:00; at 9:00; and at 10:00 of that morning 604. Data representative of the actual weather conditions that morning 606. Data representative of the weather forecast for that afternoon and evening 608.

Referring again to FIG. 3, in this implementation, at step 216, with the above-described inputs (e.g. data (in a form as was described above in respect of the inputs used to the train the neural networks—e.g. an average, minimum and maximum values) representative of the actual traffic conditions that day prior to the time of the calculation being made; data (again in a form as was described above in respect of the inputs used to the train the neural networks) representative of the actual weather conditions that day prior to the time of the calculation being made. Data (again in a form as was described above in respect of the inputs used to the train the neural networks) representative of the weather forecast for time periods later that day): At step 218: (I) Three (3) of the independent neural networks will output a number representative of the predicted degree of traffic congestion for that hour. (II) Three (3) of the independent neural networks will output the predicted degree of traffic congestion for the hour after that hour. (III) Three (3) of the independent neural networks will output the predicted congestion for the hour two (2) hours after that hour. (IV) Three (3) of the independent neural networks will output the predicted congestion for the hour three (3) hours after that hour. Three (3) of the independent neural networks will output the predicted congestion for the hour four (4) hours after that hour. The output for each set of 3 independent neural networks is averaged (and rounded if necessary to the nearest whole number), thus yielding, for that hour, one average predicted degree of traffic congestion for that hour, one average predicted degree of traffic congestion for the hour after that hour, one average predicted degree of traffic congestion for the hour 2 hours after that hour, one average predicted degree of traffic congestion for the hour 3 hours after that hour, and one average predicted degree of traffic congestion for the hour 4 hours after that hour. At step 220, each of those numbers is assigned a color based on the scale noted above and those are what is displayed on the Yandex website 10 shown in Figure one.

At the next hour, another (separate) 15 of the neural networks are used, and for each hour throughout the day for which calculations are being done, 15 different ones of the neural networks (assigned to that particular hour) are used. In this implementation, as was described above. In the next hour, any information calculated by the 15 neural networks of the previous hour is not used for any purpose. Solely the then currently available traffic and weather data is input in the fifteen (15) neural networks of that assigned to be used for hour.

Figure 6:
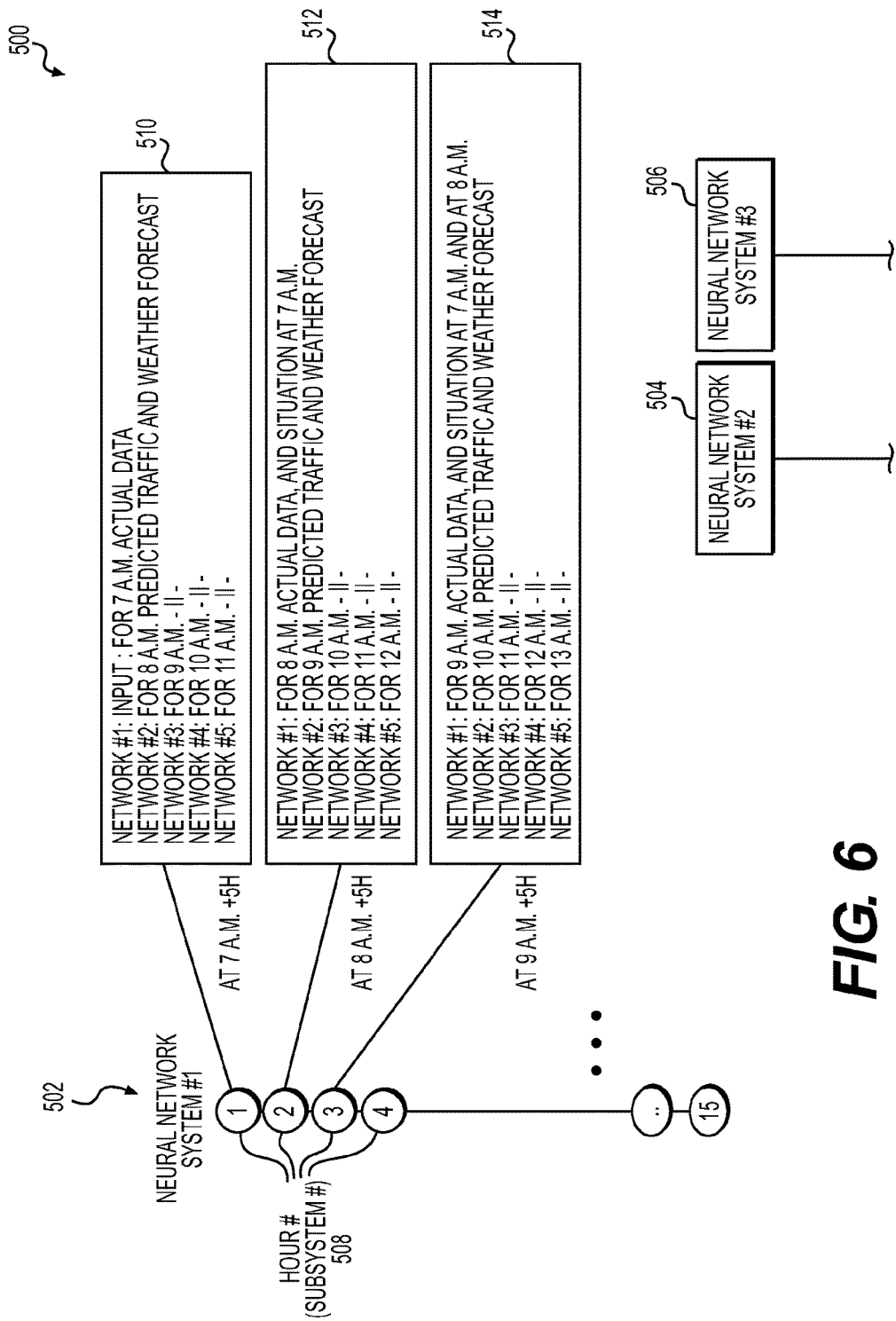
FIG. 6 is a schematic illustrating various artificial neural network systems of an implementation of the present technology and their various outputs.

This is illustrated in FIG. 6. In FIG. 6, each of the neural networks of this implementation are notionally divided in three neural network systems 502, 504, 506 as was described above. For neural network system #1 502, there are 15 subsystems 508, one for each hour in which calculation is to be made. Within each subsystem there are 5 neural networks, one use for calculations in respect of the then current hour, and four more, one for each of the following four hours, with each one being used for calculations in respect of one of those hours. This, in this implementation, subsystem #1 is assigned for use at 07:00, and the five networks of subsystem #1 510 are assigned to make calculations at 07:00 in respect of 07:00; 08:00; 09:00; 10:00; and 11:00. Subsystem #2 is assigned for use at 08:00, and the five networks of subsystem #2 512 are assigned to make calculations at 08:00 in respect of 08:00; 09:00; 10:00; 11:00; and 12:00. Subsystem #3 is assigned for use at 09:00, and the five networks of subsystem #2 512 are assigned to make calculations at 09:00 in respect of 09:00; 10:00; 11:00; 12:00; and 13:00. And so on. The same can be said of neural network system #2 504 and the subsystems thereof and of neural network system #3 506 and the subsystems thereof.

It is important to note that the above-described implementation of the present technology is only one implementation of the present technology, there are many others. For example, in the above-described implementation, the prediction of a future degree of traffic congestion is operative between the hours of 07:00 and 22:00. In other implementations, those times will vary. In the above-described implementation, the prediction of a future degree of traffic congestion is effective for the 4 hours following the then current hour. In other implementations, that number of hours will various. In other implementations, the nature, timing, type, period, etc. of the input source data will vary. In other implementations, the nature, time, timing, period, etc. of the output data will vary. In other implementations, the prediction period, timing etc. will vary.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:

1. A method of presenting traffic congestion to a user of a client device, the method executable by a server, the method comprising:
   inputting, by the server at a given time, into a first artificial neural network, a first set of data as input, the first set of data including traffic data in respect of roads within a geographical area and preceding the given time, the geographical area including a plurality of road segments, the first artificial neural network being one of a plurality of artificial neural networks,
      each artificial neural network of the plurality of artificial neural networks having been trained to generate a symbol representative of traffic congestion in an entirety of the geographical area for one specific time interval of a plurality of time intervals, the symbol being one of a limited number of symbols,
      the one specific time interval for which the first artificial neural network had been trained being a first time interval;
   receiving, by the server in response to the input, from the first artificial neural network, the symbol representative of the traffic congestion in the entirety of all of the plurality of road segments within the geographic area for the first time interval; and
   sending, by the server to the client device for displaying to the user in respect of the first time interval, the symbol for the first time interval; and
   wherein the symbol for the first time interval is a combination of a number and a color representative of the traffic congestion in the entire geographical area for the first time interval.

2. The method of claim 1, wherein each artificial neural network of the plurality of artificial neural networks had been trained to output the symbol for the one specific time interval for which that artificial neural network had been trained, by having received, during a training phase associated therewith:
   a plurality of second sets of data and a plurality of training-phase single values as training input,
   each second set of data of the plurality of second sets of data including traffic data in respect of roads within the geographical area and preceding the one specific time interval for which that artificial neural network had been trained, and
   each single value of the plurality of training-phase single values corresponding to that second set of data and being representative of traffic congestion in the entire geographical area during the one specific time interval for which that artificial neural network had been trained.

3. The method of claim 1, wherein the number is a whole number between zero and ten inclusive.

4. The method of claim 1, wherein the first set of data includes weather data within the geographical area preceding the given time.

5. The method of claim 1, wherein each of the plurality of time intervals is an hour.

6. The method of claim 1, wherein the first time interval includes the given time.

7. A method of presenting traffic congestion to a user of a client device, the method executable by a server, the method comprising:

inputting, by the server at a given time, into a first artificial neural network, a first set of data as input, the first set of data including traffic data in respect of roads within a geographical area and preceding the given time, the geographical area including a plurality of road segments, the first artificial neural network being one of a plurality of artificial neural networks, each artificial neural network of the plurality of artificial neural networks having been trained to generate a symbol representative of traffic congestion in an entirety of the geographical area for one specific time interval of a plurality of time intervals, the symbol being one of a limited number of symbols, the one specific time interval for which the first artificial neural network had been trained being a first time interval;

receiving, by the server in response to the input, from the first artificial neural network, the symbol representative of the traffic congestion in the entirety of all of the plurality of road segments within the geographical area for the first time interval; and sending, by the server to the client device for displaying to the user in respect of the first time interval, the symbol for the first time interval; and wherein:

the first artificial neural network comprises a set of artificial neural networks, each artificial neural network of the set of artificial neural networks generating in response to the input, a respective value for the first time interval; and the symbol outputted by the first artificial neural network comprises an average of the respective values of the set of artificial neural networks.

8. The method of claim 7, wherein:

the set of artificial neural networks includes at least three artificial neural networks generating at least three respective values, the at least three respective values include, a first value representative of a minimum degree of traffic congestion in the entirety of all of the plurality of road segments within the geographic area for the first time interval, a second value representative of an average degree of traffic congestion in the entirety of all of the plurality of road segments within the geographic area for the first time interval, and a third value representative of a maximum degree of traffic congestion in the entirety of all of the plurality of road segments within the geographic area for the first time interval; and the symbol outputted by the first artificial neural network comprises an average of the first, second and third respective values of the set of artificial neural networks.

9. The method of claim 8, wherein the symbol outputted by the first artificial neural network includes a value representative of traffic congestion in the entirety of all of the plurality of road segments within the geographic area for the first time interval.

10. The method of claim 9, wherein the symbol outputted by the first artificial neural network includes a color representative of traffic congestion in the entirety of all of the plurality of road segments within the geographic area for the first time interval.

11. The method of claim 7, wherein the first set of data includes weather data within the geographical area preceding the given time.

12. The method of claim 7, wherein each of the plurality of time intervals is an hour.

13. The method of claim 7, wherein the first time interval includes the given time.

* * * * *